Figure 1:
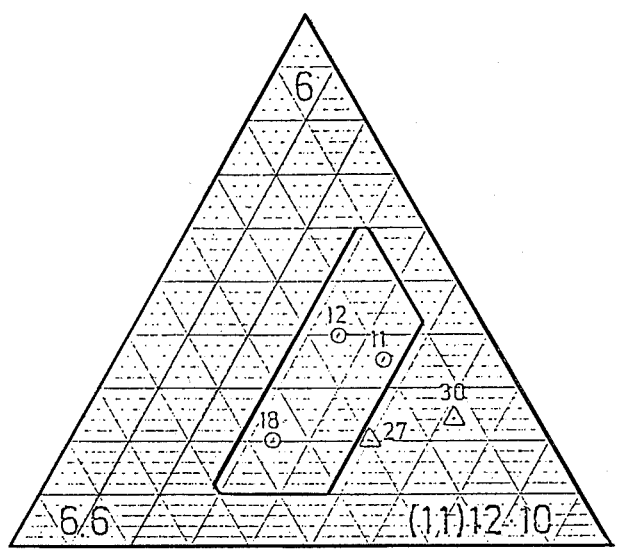

United States Patent [19]

Schmid et al.

[11] 4,225,699

[45] Sep. 30, 1980

[54] TERNARY POLYAMIDE FILAMENTS

[75] Inventors: Eduard Schmid, Bonaduz; Wolfgang Griehl, Chur, both of Switzerland

[73] Assignee: Inventa AG für Forschung und Patentverwertung, Zurich, Zurich, Switzerland

[21] Appl. No.: 867,646

[22] Filed: Jan. 6, 1978

[30] Foreign Application Priority Data

Jan. 10, 1977 [CH] Switzerland .......................... 230/77

[51] Int. Cl.$^2$ ...................... C08G 69/14; C08G 69/26
[52] U.S. Cl. ............................... 528/324; 260/33.4 P; 528/312; 528/318; 528/336; 528/338; 528/339
[58] Field of Search ................. 528/324, 325, 338, 339

[56] References Cited

U.S. PATENT DOCUMENTS

| | | | |
|---|---|---|---|
| 2,351,074 | 6/1944 | Salisbury | 528/324 |
| 3,515,702 | 6/1970 | Raabe | 528/324 |
| 3,536,780 | 10/1970 | Schaaf et al. | 528/324 |
| 3,784,495 | 1/1974 | Sprauer | 528/324 |
| 3,850,887 | 11/1974 | Halas et al. | 528/324 |
| 3,852,226 | 12/1974 | Sprauer | 528/324 |
| 3,883,485 | 5/1975 | Raabe et al. | 528/324 |
| 3,883,487 | 5/1975 | Raabe et al. | 528/324 |
| 3,933,762 | 1/1976 | Naito et al. | 528/324 |
| 3,950,297 | 4/1976 | Raabe et al. | 528/324 |

FOREIGN PATENT DOCUMENTS 44-19868  8/1969  Japan ...................................... 528/324

Primary Examiner—Harold D. Anderson
Attorney, Agent, or Firm—Bierman & Bierman

[57] ABSTRACT

Filaments of a copolyamide which is derived from at least three polyamide-forming, unbranched, saturated, randomly distributed monomer components, having an average amide group frequency of one —CONH— to 6.4 to 7.4 —CH$_2$— and in which each of said monomer components is present in an amount of 10 to 60 mol %, based on the number of moles of all said components, and the sum of the mole % amounts of all monomer components is 100, said copolyamide having a melting point of less than 155° C. A method of making such filaments is also disclosed.

3 Claims, 8 Drawing Figures

TERNARY POLYAMIDE FILAMENTS

This application claims the priority of Swiss Pat. No. 000230/77 filed Jan. 10, 1977.

The present invention relates to filaments of a copolyamide which is derived from at least 3 polyamide forming, unbranched, saturated and statistically distributed (i.e random) monomer components, as well as a process for the production of such filaments. These oriented, crystalline filaments lose their filamentary structure when contacted by water vapor.

The common homopolyamides, i.e. polyamides which are derived from one monomer component such as nylon 6, nylon 66 nylon 610, nylon 612 etc., have clearly defined melting points, which is demonstrated, for example, by a narrow melt point in differential thermoanalysis (hereinafter abbreviated as "DTA"). Such polyamides show e.g. in hot water a thermoshrinking of only a few percent, and they do not lose their filamentary structure.

It is known, however, that the properties of polyamides may be greatly varied by using several monomer components (copolyamides). If monomer mixtures of 2, 3 or more components are used as starting materials for the production of polyamides, the properties of the product may vary greatly, according to the mixing ratio and the nature of the monomers. Thus, for example, the melting point of copolyamides from 2 components varies according to the percentage contribution of the components, as can be illustrated by a simple diagram. If the copolyamide consists of three components, the properties of the product may be graphically shown by means of so-called triangle-coordinate-diagrams. Therein, each point on the triangle area represents a clearly defined copolyamide and its composition. The use of copolyamides for the production of filaments is known, usually for the production of crimped fibres and filaments where a homopolyamide (nylon 6 or nylon 66) is spun with a copolyamide, e.g. in the so-called side-by-side-arrangement. In this case, the copolyamide which is used contains generally the same main monomer components as the corresponding homopolyamide, and just enough of the additional component(s) that its thermoshrinking in the subsequent heating process is increased a sufficient extent over the homopolyamide that the desired crimping can be achieved.

This can be seen, for example, in U.S. Pat. No. 3,901,989, according to which the homopolyamide—nylon 66 is spun in the same volume ratio as the copolyamide (Example 1: copolyamide of 60% by weight hexamethylenediamine adipate with 40% by weight caprolactam—in a side-by-side-arrangement through the same spinning nozzle. Many other copolyamides, in addition to those of nylon 6 and 66, are described as possible additional components and are also illustrated by way of examples in the accompanying triangle coordinate diagrams.

It is relatively simple to spin filaments from homopolyamides which have a sharp melting point. If the homopolyamides contain hydrophilically acting additives such as certain antistatic agents (British Patent Specification No. 1,325,778), or if so-called ether-diamines are used as amine components (British Patent Specification No. 1,304,865), the homopolyamides can only be drawn with difficulty from the spin bobbin for the stretching operation. If copolyamides are alloyed or spun with homopolyamides in a side-by-side-arrangement, problems in drawing the filaments from the spin bobbin also arise. However, the homopolyamide component acts here strongly as an "anti-sticking-additive".

In all the cases described, it has been attempted to overcome the sticking problems of the spun threads, and of course the possible solutions may be extended to copolyamides.

The following patent specifications, in particular, give a good view of the state of the art concerning procedures for decreasing or avoiding the sticking of freshly spun polyamide, copolyamide or polyamide alloy filaments.

(1) British Patent Specification No. 1,325,778. Here are described, in particular, long paraffin chains containing additive which are applied to the chips, such as e.g. n-paraffins, lauric acid and its salts, stearylamine, stearamide, amides of long-chain carboxylic acids and amines, esters of long-chain monomers etc. and (2) British Patent Specification No. 1,304,865. Here is connection with the production of novel polyamides the methods which help to avoid sticking on the spin bobbin during spinning of the described polyetheramines are given systematically.

(3) U.S. Pat. No. 3,901,989. The crimped bicomponent-filaments described are prepared by the spin-drawing method on which further operations follow. As stretched filaments have hardly any sticking properties, the problems of sticking on the spin-bobbin are avoided. The spin-drawing method for the production of bicomponent-fibres is also suggested in British Patent Specification No. 1,304,504.

(4) Belgian Patent Specification No. 691,700 gives a summary of many individual patent specifications or patent applications which have been published, e.g. in Japan, U.S.A. and Britain. This specification summarises methods for avoiding the sticking effect of copolyamide filaments on the spin bobbin. These methods correspond essentially to the state of the art as described in British Patent Specification No. 1,325,778. British Patent Specification No. 1,201,101 shows that polyolefins which lessen the adhesiveness of spun threads can also be incorporated in the copolyamide in the form of a solution.

(5) In order to decrease adhesiveness, compositions for spinning which contain oil or paraffin emulsions have often been taught in the prior art (e.g. in British Patent Specification No. 1,304,865, U.S. Pat. No. 3,720,576, Japanese Publication No. 7,243,769, German Offenlegungsschrift No. 1,669,481). Alternatively absolutely water-free spin-preparations are applied to the filaments (British Patent Specification No. 1,393,802).

Surprisingly, a new class of copolyamides of aliphatic components (monomer components) which show an interesting new application have been found. Filaments of such copolyamides, having good tensile strength in the dry state, are destroyed within a short time under the influence of saturated water vapor at standard pressure.

At the present time, knitted fabrics of natural or artificial fibres are produced continuously on automatic knitting-machines with high outputs, preferably as long fabric lengths for subsequent use, however a separation into short fabric lengths is necessary. Hitherto this problem has been solved by knitting in, for example, a thick and clearly visible solid cotton or nylon thread at the desired intervals. This thread had to be laboriously withdrawn by hand after the knitting process.

By using the new filaments according to the invention, the separation can take place by treating the fabric with water vapor at 95° C. or higher, whereby the structure of the new filaments is quickly and completely destroyed and the knitted fabric is separated into the desired lengths.

Accordingly, the present invention concerns filaments of copolyamides which lose their filamentary structure in saturated water vapour at normal pressure. According to the invention, filaments of copolyamides are provided which are derived from at least three polyamide forming, unbranched, saturated, statistically distributed (i.e. random) monomer components. The copolyamide has an average amide frequency of one —CONH— to 6.4–7.4 —CH$_2$— (alternatively one —CH$_2$— to 0.156–0.135 —CONH—) and each monomer component is present in an amount of 10 to 60 mol % (based on the entire molar amount of the sum of all monomer components) and the sum of the mol-%-moieties of all monomer components is 100. The copolyamide has a melting point of less than 155° C.

Suitable monomer components contain both the —CONH— forming functions, i.e. the groups —NH$_2$ and —COOH (or their derivatives) in the same molecule, such as aminoacids (in particular ω-aminoacids, such as aminocaproic acid or aminoundecanoic acid), or lactams (such as caprolactam or laurolactam). Compounds in which the amine and the carboxylic functions are present on different molecules can also be used. Examples of these are salts of aliphatic diamines with aliphatic dicarboxylic acids, especially of α,ω-diaminoalkanes with α,ω-dicarboxyalkanes, in which the alkane radical is saturated and unbranched. Examples of suitable such salts are hexamethylenediamine azelate, sebacate, and dodecate; and nonamethylene diamine adipate, azelate, sebacate, and dodecate.

If the copolyamide according to the invention contains more than three monomer components, then monomers which do not belong to the group of aliphatic saturated α,ω-dicarboxylic acids diamines can be used as additional adducts in amounts of 0–10 mol %, based on the sum of all adducts. Examples of such monomers are cycloaliphatic diamines and dicarboxylic acids, as well as aromatic dicarboxylic acids. The monomers can have side chains and can also have more than one nucleus. Aliphatic dicarboxylic acids and diamines which have side chains can also be used.

Preferred copolyamides are derived from: nylon 6/6, 6/12; 6/6, 9/12; 6/6, 10/12; 6/6, 6/11; 6/6, 9/11; 6/6, 10/11.

Therein the numbers represent, with reference to the example 6/6, 6/12: copolyamide of nylon 6, from the salt of hexamethylenediamine and adipic acid (each having 6 carbon atoms) and nylon 12, etc. Among these copolyamides, owing to the particularly good quality of the raw materials, their good availability and their favourable prices; copolyamides of nylon 6, nylon 66 and nylon 12 and of nylon 6, nylon 66 and nylon 11 are particularly preferred.

The molar composition (within the definition) preferably embraces the range of the copolyamides melting at 115°–150° C.

Further, the present invention concerns a process for the production of copolyamide filaments which is characterised in that at least three polyamide forming, unbranched, saturated monomer components. These components together have an average amide frequency of one —CONH— to 6.4–7.4 —CH$_2$— (alternatively, one —CH$_2$— to 0.156–0.135 —CONH—) and are each present in amounts of 10–60 mol % (based on the total molar amount of the sum of all monomer components, the sum of all mol % moieties of the monomer components being 100). They are transformed by spinning and stretching to filaments by known methods.

In a preferred way of carrying out the process, the filaments are provided with the so-called equilibrium amount of water, after the spinning and before the winding-up. This is best achieved by means of a preparation roller, but can also be carried out by smoke-screening or spraying of water, e.g. into the lowest third of a spinning duct or into the zone between the preparation roller and the winding-up device. The equilibrium amount of water is the amount of water which is taken up by an absolutely dry filament at a temperature of 23° C. and a relative air humidity of 50%, until the equilibrium state is attained.

The melting points of the copolyamides according to the invention are preferably in the range of 100°–150° C. In order to determine the melting point in a reproducible manner, the substances must frequently be tempered for some time, e.g. at 80° C.

If, after the tempering process, a so-called DTA-curve is measured with the aid of the Perkin-Elmer differential calorimeter type 1B at a heating rate of 32° C./minute and with a sensitivity according to the R-16 setting, the melting point in the tables in the Examples is defined by the maximum point in the melting curves.

If no sharp melting peak can be observed in the differential calorimeter, the melting point is then given by the temperature at which, on the so-called Kofler heating device, a piece of the polymer having an edge length of about 1 mm. loses its corners and edges within 30 minutes and the tendency to form drops is visible.

Especially preferred are those copolyamides whose DTA-curve shows a single sharp melt peak after crystallisation, and whose maximum melting point is between 100° and 150° C.

The copolyamides according to the invention possess an equilibrium water uptake according to the above definition of about 2.3–3.5% by weight. In comparison with the filaments according to the invention, the copolyamide filaments which are outside the definition and which contain the components nylon 6 and nylon 66 in a mixing ratio of 60–70 mol % polycaprolactam and 30–40 mol % polyhexamethylenediamine adipate, have a melting point of about 183° C. (determined according to the described DTA-method). The amide group frequency of the filaments outside the definition is one —CONH— per 5 —CH$_2$— (or 0.2 —CONH— per 1 —CH$_2$—). Owing to the increased amide group frequency, the value for the equilibrium water uptake is distinctly higher (ca. 3.9% by weight). Such a "hydrophilic" filament also has, in principle, "separation-yarn properties". However, owing to the distinctly higher melting point in comparison to the filaments according to the invention, the necessary water reaction time is much longer than it is for the filaments according to the invention. Therefore, before the separation begins, the filament takes up so much water that a tacky mass is formed. After the separation of the fabric pieces, they can easily stick together again. Apart from this, after cooling, crusty and easily visible residues remain at the separated edges.

In contrast thereto, the filaments according to the invention need a much shorter interaction time with the vapor before the thread loses its structure and contracts to very small non-tacky drops and separation occurs.

On consideration of the triangle coordinate diagram No.2 (enlarged drawing) of the components nylon 6, nylon 66 and nylon 12, the isotherms of the melting points, i.e. the lines corresponding to the compositions of the copolyamides which have the same melting points, can be seen as rounded curves. The area No.2, covering the centre of the triangle, includes that area which corresponds to the copolyamides according to the defined conditions (molar composition, amide group frequency). The hatched region (below left) should preferably be eliminated from this area, since it contains copolyamides having melting points above 150° C.

The copolyamides on the left of area No.2 have amide group frequencies which exceed the limit of 0.156. Such copolyamides are difficult to stretch in the form of multifilaments since they tend to stick on the spin bobbin. During the separation process which is carried out later, such threads afford tacky and easily visible residues on the fabrics.

Copolyamides on the right of the area No.2 have an amide group frequency which is below the value of 0.135. Their methylene group content is so high that the sensitivity towards water vapor, for which the equilibrium water uptake is a measure, is decreased so far that no further destruction of the filament occurs with saturated water vapor at normal pressure. However, filaments can generally be spun from copolyamides which possess an amide group frequency of e.g. 0.135 to 0.09 and these are suitable as sticking filaments for most varied applications in the textile area.

In the triangle coordinate diagrams which are shown in the drawings as examples in which the components are each recorded in equivalent percentage amounts (based on the sum of all monomer components), it will be understood that that portion of the single component is meant which forms one amide bond equivalent during the polymerisation. I.e., if aminoacids or lactams are used as monomers, their molecular weight corresponds to the equivalent weight with respect to the formation of one amide group. If salts of a dicarboxylic acid and a diamine are used as monomers, their equivalent weight with respect to the formation of one amide bond corresponds to the half of the total weight of amine and acid. This equivalent weight value is denoted throughout the present specification as one mole of the corresponding monomer component.

Figure 2:
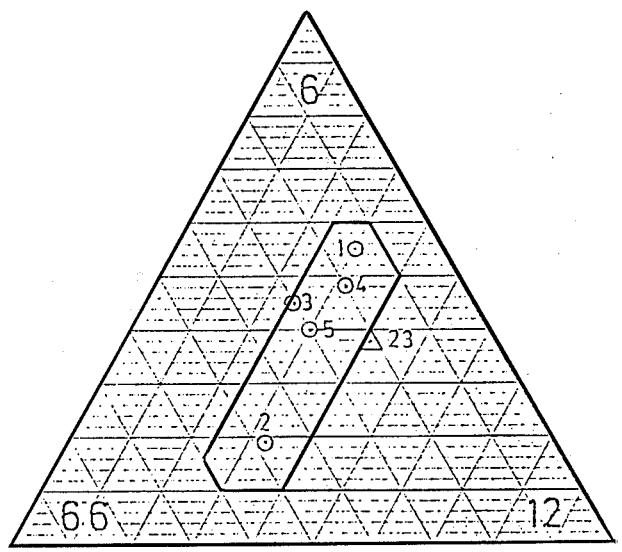
Figure 4:
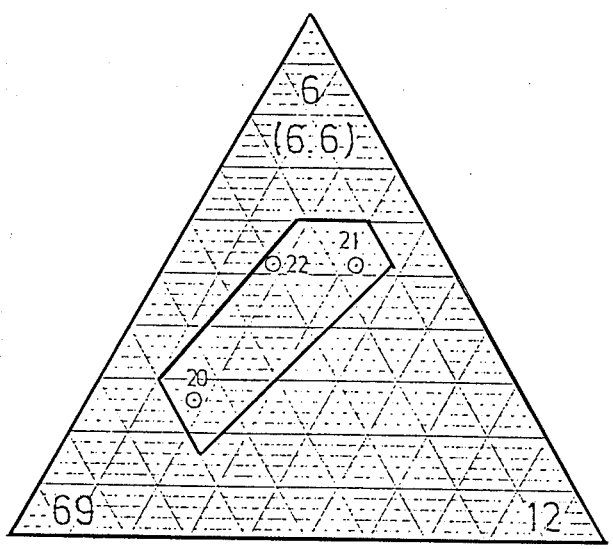
Figure 5:
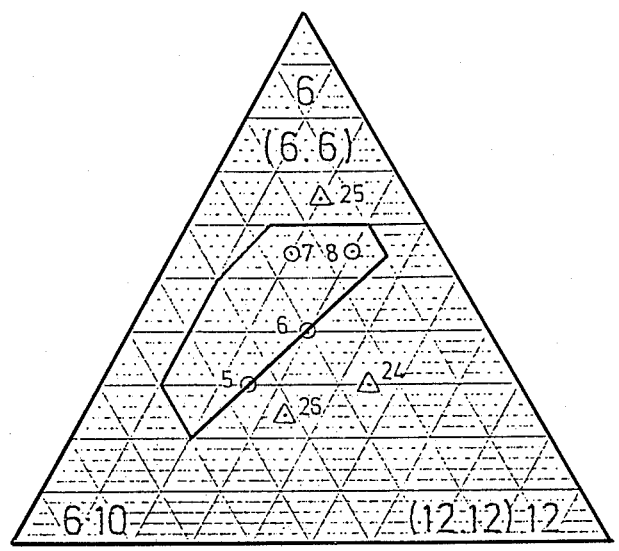

As can be seen from the areas of the triangles, and from what is commonly known, similar monomers can largely be exchanged without greatly changing the properties of the polymer. So, for example, the copolyamide which contains 40 equivalent % of nylon 6 and 26 equivalent % of nylon 12,11 or nylon 12,12 is in area No.2 if the third component is nylon 66 (FIG. 2), nylon 69 (FIG. 4) or nylon 610 (FIG. 5). Also the areas corresponding to the copolyamides according to the invention of nylon 6 and nylon 12 as first and second components, and nylon 69 or nylon 610 (FIGS. 4 and 5) as the third component, are very similar. Thereby, the equivalent amount of nylon 69 or nylon 610 can vary in the very wide range of 10-60 equivalent %.

It is therefore easy to comprehend that, as the third component, a mixture of nylon 69 and nylon 610 salt can be used for the production of copolyamides according to the invention, instead of pure nylon 69 salt, so that the copolyamide according to the invention is prepared from 4 monomer components. In principle, the copolyamides of the invention may be prepared from even more monomer components. The expert will however restrict himself as far as possible to three components.

Further, it is known to the expert that, by minor replacement of polyamide elements according to the definition by other monomers (outside the given definition), the polymer properties do not change so much that products with properties outside the scope of the invention result. If, for the replacement of monomers according to the definition, monomers are used which are similar in structure and in their properties, a replacement of monomers is possible to a greater extent (e.g. up to 10 mol %), than for replacement by very different monomers. For example, dicarboxylic acids, diamines or aminoacids which are side-chain substituted to only a small extent, may be substituted to a much greater extent than monomers such as cycloaliphatic side-chain substituted diamines or aromatic dicarboxylic acids. Copolyamide filaments containing such different monomers in an amount of up to 10 mol %, but mainly containing monomer mixtures according to the invention, are of course also included in the scope of the invention.

For the spinning of known homopolyamides containing additives, of bicomponent fibers, and the hitherto known copolyamides, the provisions described in the introduction are satisfactory. To overcome the occurrence of difficulties in stretching these expedients are not satisfactory in the case of the copolyamides according to the invention.

With the help of the process according to the invention, it is possible to spin copolyamides which are made from 3 or more monomers according to the definition, and to stretch them satisfactorily.

The following Examples illustrate the invention.

EXAMPLES 1-34

Table 1 sets out copolyamides according to the invention and some of their properties.

Table 2 contains copolyamides from the same monomer components but which lie outside the scope of the invention.

Table 3 contains copolyamides of the nylon 6/6, 6/12 system (see FIG. 2) whose amide group concentration is clearly distinct.

These products exhibit significantly different equilibrium water uptakes. The differences become still greater at temperatures of up to 100° C., so that the product according to Example 32 does not lose its thread structure because of insufficient reaction with depressurized vapour. The product according to Example 33 loses its thread structure completely in an ideal manner, and the third product (Example 34) takes up so much moisture that a lumpy, tacky mass is formed.

Table 4 contains copolyamides which are formed out of 4 components. The fourth monomer component, which is present in amounts of 0-10 mol % based on the sum of all monomer components, consists of monomers which in their structure are outside the class of linear, saturated monomers. As the Examples show, filaments with properties according to the invention can be prepared from these copolyamides.

Preparation of the copolyamides

The copolyamides given in the tables as Examples 1-34 were prepared (in an open condensation tube under nitrogen) from a total of 20-60 g of the three or more monomer components according to the invention.

To make this unpressurised procedure possible, aminolauric acid was chosen as monomer component for the nylon 12 fraction, caprolactam and also partially aminocaproic acid as the nylon 6 fraction. In all other cases, the salt of diamine and dicarboxylic acid (symbolised in the usual way by figures; for example 6,6=hexamethylenediamine adipate) was used.

The molar composition of the monomer components is given in column 3. To assure that the monomer components are calculated on the same basis, 1 mol of monomer component is always taken as that amount which leads to the formation of one amide group in the polymer.

The monomer components were weighed into the condensation tube and about 0.5 mol % of chain regulator was added thereto. Following this, the air was replaced by nitrogen, the condensation tube was then immersed in a salt bath at a temperature of 230°–250° C., and the mixture was condensed for 5–8 hours under a nitrogen atmosphere. The polymer was removed from the tube and comminuted. The relative solution viscosity was measured on a 0.5% by weight solution in m-cresol. The melting point was measured, after tempering the specimen, with a differential thermal calorimeter on a Kofler heating device. To compare the separation properties of the individual samples, the following test was carried out:

In a beaker covered by a piece of glass and having a volume of about 2000 ml, 200 ml of water are introduced and brought to boiling. In the gas volume, the air is slowly replaced by water vapor until the vapor finally passes through the lip. Meanwhile, two light cotton tissues, having an edge length of 50 mm, are sewn together by using a separation thread so that the seam has 12 stitches in total. The upper tissue is now fixed to a glass rod. The lower tissue is loaded equally over its whole length with a weight of 2.6 g.

The glass-cover is now removed, the glass rod with the tissues quickly introduced into the vapor atmosphere, and the glass replaced so that there is as little mixing as possible of the water vapor with air. The time which is necessary to destroy the separation filament seam, so that the loaded tissue falls down, is noted.

In connection with the Tables, various triangle coordinate diagrams are shown wherein the areas representing copolyamides according to the invention are ringed. These areas are calculated with the help of the conditions defined according to the invention, and the areas are each limited by straight border lines. It is now easy to find the zones which correspond to copolymers with melting points above 150° C., where the separation properties become uncertain or the separation times too long, by condensation tests in the region of the border lines and in particular in the region of the points of the triangle. In the triangle coordinate diagrams, components with the same average methylene group number between the amide forming groups can be interchanged.

EXAMPLE 35

For the polymerization, a 1000 liter autoclave with a melt tank was used. In the order listed, 228 kg caprolactam, 220 kg laurolactam, 152 kg hexamethylenediamine adipate, 3.12 kg adipic acid (as a chain regulator), 4.5 kg n-paraffin with a melting point of about 60° C., 25 liters of water, and 40 g of an antifoaming agent, were introduced into the melt tank heated to about 160° C. With continuous stirring, the mixture was melted and then introduced into the autoclave.

In the closed autoclave, the melt was heated to 280° C. with stirring, whereby a pressure of 14-≠atm built up. The duration of the so-called pressure phase, reckoned from the time a temperature of 250° C. was reached, lasted 7 hours. At the end of this pressure phase, the heating was reduced to 256° C., the pressure released, and the mixture degasified under a stream of nitrogen for 2 hours. The melt was then pressed through a 6-hole nozzle using a spinning pump, and the strands were cooled in a water-bath and granulated.

The maximum melting point of the tempered material in the DTA was 121° C.; its relative solution viscosity, measured in a 0.5 wt % solution in m-cresol, was 1.69. The part extracted with warm water was 2.8 wt %. The granules were dried at 80° C. in vacuo.

The granules were then covered with with 0.5 wt % of ethylene bis(stearamide) powder and melted in a Maillefer extruder, type D 40/140 (producer: Maillefer, Ecublens, Switzerland), in which the cylinder temperatures were from 230° to 245° C. The melt was then transferred using a spinning pump at a constant rate of 52 g/min to a 20-hole spinneret, and the spun filament was withdrawn through a spinning shaft at a speed of 800 m/min.

Before winding up, the spun-filament was treated with a 15 wt % aqueous solution of Limanol ZEB (Schill and Seilacher, Boblingen, West Germany) so that the freshly spun filament has its equilibrium amount of water, which is about 3 wt %, directly applied to the surface of the filament. The spinning bobbins were now stored for about 24 hours in normal climatic conditions (50% rel. humidity, 23° C.), and a lengthening of the wound filament took place on the spool. The spun filament was then stretched to a total deformation of 4.025 at which it showed an elongation at break of 38–40%.

50 spin bobbins, each containing 1.1 kg of filament were spun. On stretching, a quality 1 cop output of nearly 100% was achieved, and the number of fibrils was about 0.18 fibrils per kilogram of stretched material.

In a further spinning test with granules of the same type of copolyamide which had a solution viscosity of 1.74, different preparation systems were compared, which were each applied as a 15% aqueous solution. In one trial only water was applied in the equilibrium concentration.

After storage of 24 hours under standard climatic conditions, the unwinding tension of the filaments was measured with a tensiometer. In most cases this was from 4–5 ponds. The case where only water was used on the preparation roller is especially interesting. The unwinding tension was only about 4 ponds, but a strong spreading of the fiber bundle could be observed. Nevertheless the test spool could be stretched without fibril breaks.

On the other hand, by using a non-ionogen silicon-based preparation (type TM 1805 from Vimmer & Schwartz, D 5420 Lahnstein West Germany) a very restless unwinding of the filament with very strong fluctuations (up to a maximum of the unwinding tension of 60 ponds) could be observed.

As this Example clearly demonstrates, the spinning preparation by no means improves the unwinding tension behaviour of the filament from the spinning spool. The spinning preparation is however necessary for the adhesion of the fibres as well as the necessary lubricating properties of the filament for subsequent operations.

Table 1

| Example No. | Triangle coordin-diagram no. | molar ratio of the monomer components | | | | | | | | Separation test/sep-aration time sec. | analysis melting point DTA max °C. | η rel. 0.5% m-cresol | amide group frequency —CH₂— per —CONH— | —CONH— per —CH₂— |
|---|---|---|---|---|---|---|---|---|---|---|---|---|---|---|
| | | 6 | 66 | 12 | 12,12 | 610 | 910 | 99 | 12,10 | | | | | |
| 1 | 2 | 55 | 15 | 30 | | | | | | 10 | 128 | | 6,8 | 0,147 |
| 2 | | 19 | 48 | 33 | | | | | | 13 | 153 | 1,32 | 7,0 | 0,143 |
| 3 | | 45 | 30 | 25 | | | | | | 4 | 127 | 1,40 | 6,5 | 0,154 |
| 4 | | 48 | 20 | 32 | | | | | | 9 | 127 | 1,49 | 6,9 | 0,145 |
| 15 | | 40 | 30 | | 30 | | | | | 70 | 105 | | 6,8 | 0,147 |
| 5 | 5 | 30 | | 25 | | 45 | | | | 9 | 141 | 1,33 | 7,4 | 0,135 |
| 6 | | 40 | | 30 | | 30 | | | | 3,5 | 134 | 1,43 | 7,4 | 0,135 |
| 7 | | 55 | | 20 | | 25 | | | | 3 | 154 | 1,40 | 6,7 | 0,149 |
| 9 | 3 | 35 | 20 | | | | 45 | | | 9 | 136 | 1,60 | 6,6 | 0,152 |
| 10 | | 30 | 18 | | | | 52 | | | 40 | 141 | 1,52 | 6,8 | 0,147 |
| 11 | 1 | 35 | 20 | | | | | 45 | | 30 | 136 | 1,84 | 7,3 | 0,137 |
| 12 | | 40 | 25 | | | | | 35 | | 6 | 111 | 1,81 | 6,8 | 0,147 |
| 18 | | 20 | 46 | | | | | 34 | | 10 | 140 | | 6,7 | 0,143 |
| 13 | 7 | 60 | | 15 | | 25 | | | | 2 | 146 | 1,84 | 6,8 | 0,147 |
| 16 | 6 | 44 | 16 | | | 40 | | | | 2 | 130 | 1,77 | 7,2 | 0,139 |
| 17 | | 58 | 14 | | | 28 | | | | 4 | 133 | 1,81 | 6,7 | 0,149 |
| 19 | | 56 | 30 | | | 14 | | | | 5 | 125 | 1,78 | 7,2 | 0,139 |
| | | | 69 | | | | | | | | | | | |
| 20 | 4 | 26 | 56 | 18 | | | | | | 2 | 129 | 1,56 | 6,9 | 0,145 |
| 21 | | 52 | 16 | 32 | | | | | | 8 | 112 | 1,80 | 7,2 | 0,139 |
| 22 | | 52 | 30 | 18 | | | | | | 4 | 108 | 1,72 | 6,5 | 0,154 |
| 14 | — | 40 | 25 | | 15 | | | | 20 | 12 | 102 | 1,88 | 6,9 | 0,145 |

Table 2

| Example No. | triangle-coordinate diagram No. | molar ratio of the monomer components | | | | | | | | separation test/sep-aration time, sec. | analysis melting point DTA max °C. | η rel. 0.5% m-cresol | —CH₂— per —CONH— | remarks |
|---|---|---|---|---|---|---|---|---|---|---|---|---|---|---|
| | | 6 | 66 | 12 | 12,12 | 610 | 910 | 99 | 12,10 | | | | | |
| 23 | 2 | 38 | 21 | 41 | | | | | | >120 | 126 | 1,463 | 7,46 | amide group frequency |
| 24 | 5 | 30 | | 45 | | 25 | | | | >120 | 144 | 1,487 | 8,20 | amide group frequency |
| 25 | 5 | 85 | | 20 | | 15 | | | | >120 | 180 | 1,475 | 6,50 | too much 6 |
| 26 | 5 | 24 | | 34 | | 42 | | | | >120 | 166 | 1,638 | 7,88 | amide group |
| 27 | 1 | 20 | 30 | | | | | 50 | | >120 | 133 | | 7,50 | amide group frequency |
| 28 | 3 | 24 | 14 | | | | 62 | | | >120 | 155 | 1,905 | 7,17 | too much 910 |
| 29 | 3 | 20 | 12 | | | | 68 | | | >120 | 154 | 1,766 | 7,39 | too much 910 |
| 30 | 1 | 24 | 14 | | | | | 62 | | >120 | 152 | 1,956 | 8,11 | amide group frequency |
| 31 | — | 30 | 18 | 22 | | | | 30 | | ~100 | ~120 | 1,938 | 7,81 | amide group frequency |
| 8 | 5 | 55 | | 30 | | 16 | | | | 90 | 162 | 1,50 | 7,1 | — |

Table 3

| Example No. | triangle coordinate diagram No. | molar ratio of the monomer component | | | | | | | | separation test/separ-ation time sec. | analysis melting point DTA max. °C. | —CH₂— per —CONH— | water uptake 23° C./50% relative humidity |
|---|---|---|---|---|---|---|---|---|---|---|---|---|---|
| | | 6 | 66 | 12 | 12,12 | 610 | 910 | 99 | 12,10 | | | | |
| 32 | 2 | 29 | 30 | 41 | | | | | | >120 | 126 | 7,46 | 2,20 G-% |
| 33 | 2 | 36 | 40 | 24 | | | | | | 11 | 119 | 6,44 | 3,12 G-% |
| 34 | — | 70 | 30 | — | | | | | | 60 | 176 | 5,00 | 3,88 G-% |

Table 4

| Example No. | 6 | 6,6 | 12 | 4th component (salt of:) | mol % | separation test/separation time sec. | melting point DTA max. °C. | η rel. 0.5% m-cresol | —$CH_2$— per —CONH— of the main monomer component |
|---|---|---|---|---|---|---|---|---|---|
| 35 | 43 | 20 | 32 | Trimethylhexamethylenediamine/ Adipic acid | 5 | 3,6 | 117 | 1,646 | 7,0 |
| 36 | 19 | 43 | 33 | 1,3-Bisaminomethylcyclohexane/ Adipic acid | 5 | 4,8 | 122 | 1,421 | 7,1 |
| 37 | 19 | 48 | 28 | Hexamethylenediamine/ Terephthalic acid | 5 | 3,7 | 121 | 1,354 | 6,8 |

In the accompanying drawings, the area of the terpolymers with properties according to the invention is shown in each triangle.

Figure 3:
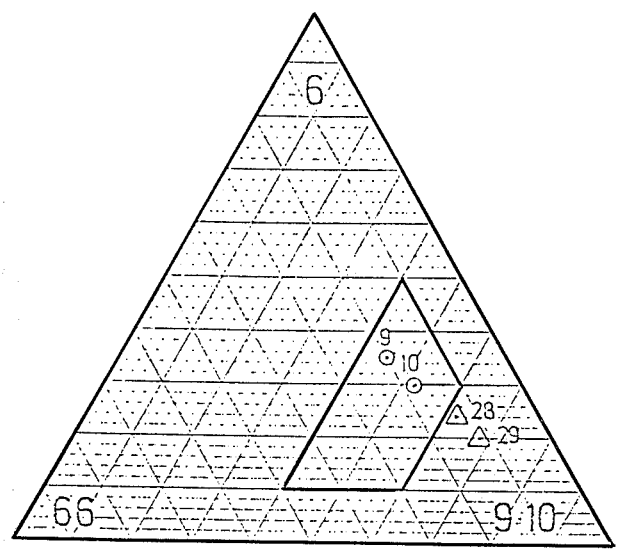
Figure 6:
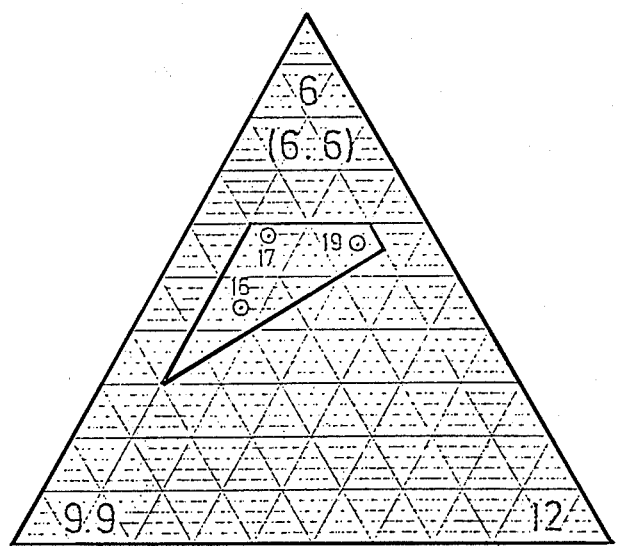
Figure 7:
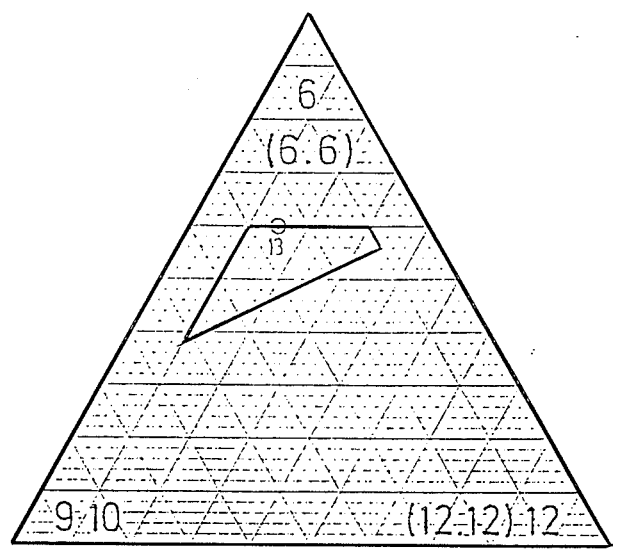
Figure 8:
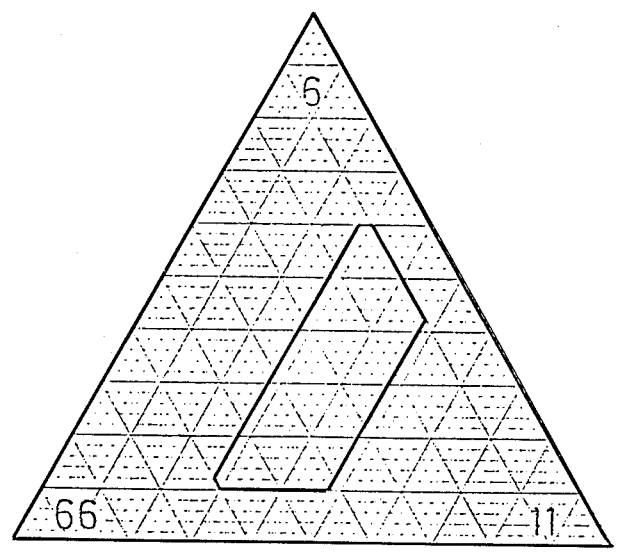

FIG. 1: Copolyamide system 6/66/12,10
FIG. 2: Copolyamide system 6/66/12 (also in enlarged form, see below) or 6/66/12,12
FIG. 3: Copolyamide system 6/66/9,10
FIG. 4: Copolyamide system 6/69/12
FIG. 5: Copolyamide system 6/610/12
FIG. 6: Copolyamide system 6/99/12
FIG. 7: Copolyamide system 6/910/12
FIG. 8: Copolyamide system 6/66/11
FIG. 2 (enlarged version) for 6/66/12
No.(1)=melting point isotherm
No.(2)=area of the terpolymer with properties according to the invention
No.(3)=zone with too high melting points

What we claim is:

1. An oriented, crystalline filament comprising a copolyamide which is derived from at least three polyamide-forming, unbranched, saturated, randomly distributed monomer components, having an average amide group frequency of one —CONH— to 6.4–7.4 —$CH_2$— and in which each of said monomer components is present in an amount of 10–60 mol %, based on the number of mols of all said components, and the sum of the mol % amounts of all monomer components is 100, said copolyamide having a melting point of less than 155° C.

2. A filament according to claim 1 wherein said compounds are the monomer units of nylon 6, nylon 66, and nylon 12 or 11.

3. A filament according to claim 2 wherein said copolyamide has a differential thermal analysis curve after crystallization which has a single sharp melting peak and in which the maximum melting point is less than 150° C.

* * * * *